(12) United States Patent
Chen (10) Patent No.: US 9,158,105 B2
(45) Date of Patent: Oct. 13, 2015

(54) TRANSMISSION/REFLECTION DUAL-FUNCTIONAL ELECTROWETTING DISPLAY PANEL

(71) Applicant: Shenzhen China Star Optoelectronics Technology Co., Ltd., Shenzhen, Guangdong (CN)

(72) Inventor: Hsiaohsien Chen, Guangdong (CN)

(73) Assignee: Shenzhen China Star Optoelectronics Technology Co., Ltd, Shenzhen, Guangdong (CN)

( * ) Notice: Subject to any disclaimer, the term of this patent is extended or adjusted under 35 U.S.C. 154(b) by 222 days.

(21) Appl. No.: 14/008,594

(22) PCT Filed: Jul. 24, 2013

(86) PCT No.: PCT/CN2013/079971
§ 371 (c)(1),
(2) Date: Sep. 30, 2013

(87) PCT Pub. No.: WO2015/006991
PCT Pub. Date: Jan. 22, 2015

(65) Prior Publication Data
US 2015/0029576 A1 Jan. 29, 2015

(51) Int. Cl.
*G02B 26/00* (2006.01)
*G02B 26/08* (2006.01)
*G02F 1/29* (2006.01)

(52) U.S. Cl.
CPC .................................... *G02B 26/005* (2013.01)

(58) Field of Classification Search
USPC ......... 359/290–292, 295, 296, 298, 237, 242, 359/245, 250–254, 265–267, 269, 271–273, 359/282, 315–321
See application file for complete search history.

(56) References Cited

U.S. PATENT DOCUMENTS

| 2004/0164292 | A1* | 8/2004 | Tung et al. ...................... 257/40 |
| 2009/0103159 | A1 | 4/2009 | Cheng et al. |
| 2010/0060974 | A1 | 3/2010 | Wang et al. |

FOREIGN PATENT DOCUMENTS

| CN | 101355838 | A | 1/2009 |
| CN | 102269867 | A | 12/2011 |
| CN | 102652280 | A | 8/2012 |
| CN | 102998792 | A | 3/2013 |
| TW | 201241474 | A1 | 10/2012 |

* cited by examiner

*Primary Examiner* — Joseph P Martinez
*Assistant Examiner* — Brandi Thomas
(74) *Attorney, Agent, or Firm* — Andrew C. Cheng (57) ABSTRACT

The present invention provides a transmission/reflection dual-functional electrowetting display panel, which has two operation modes of transmission and reflection and specifically includes a plurality of main pixel (20). Each main pixel (20) includes a plurality of sub-pixels (22). Each sub-pixels (22) includes: a first, a second, and a third substrates (42, 44, 49), a light-blocking control layer (46), and a color displaying layer (48). The light-blocking control layer (46) includes: a first reflection electrode (53) and a first transmission electrode (54) and a first polar solution (55) and a nonpolar light-absorbing solution (56). The color displaying layer (48) includes a second reflection electrode (63) and a second transmission electrode (64) and a second polar solution (65) and a nonpolar color-displaying solution (66). The transmission/reflection dual-functional electrowetting display panel of the present invention improves the flexibility of use, the contrast ratio, and the transmission ratio of the electrowetting display panel.

15 Claims, 5 Drawing Sheets

Fig. 9 ial electrowetting display panel, and also to enhance the contrast ratio and the transmission ratio of the electrowetting display panel.

To achieve the above object, the present invention provides a transmission/reflection dual-functional electrowetting display panel, which has two operation modes of transmission and reflection. The transmission/reflection dual-functional electrowetting display panel comprises a plurality of main pixels. Each of the main pixels comprises three sub-pixels. The three sub-pixels are a red sub-pixel, a green sub-pixel, and a blue sub-pixel. Each of the sub-pixels comprises: a first, a second, and a third substrates that are parallel to each other, a light-blocking control layer arranged between the first and second substrates, and a color displaying layer arranged between the second and third substrates. The light-blocking control layer comprises: a first reflection electrode and a first transmission electrode that are arranged on the first substrate and a first polar solution and a nonpolar light-absorbing solution arranged on the first reflection electrode and the first transmission electrode. The color displaying layer comprises: a second reflection electrode and a second transmission electrode arranged on the second substrate and a second polar solution and a nonpolar color-displaying solution arranged on the second reflection electrode and the second transmission electrode. The first transmission electrode, the second transmission electrode, and the second reflection electrode are made of a transparent conductive material. The first reflection electrode is made of a conductive material having high reflectivity. When the first reflection electrode is driven by applying a driving voltage thereto, the nonpolar light-absorbing solution shrinks to the top of the first transmission electrode and the transmission/reflection dual-functional electrowetting display panel is set in the reflective mode; and when the first transmission electrode is driven by applying a driving voltage thereto, the nonpolar light-absorbing solution shrinks to the top of the first reflection electrode and the transmission/reflection dual-functional electrowetting display panel is set in the transmissive mode.

The transmission/reflection dual-functional electrowetting display panel further comprises: a plurality of first upper baffles arranged between the second and third substrates and a plurality of first lower baffles arranged between the first and second substrates. The first upper baffles and the first lower baffles are arranged to correspond to each other so as to divide the transmission/reflection dual-functional electrowetting display panel into a plurality of main pixels.

The light-blocking control layer further comprises a first electrode protection layer arranged on the first reflection electrode and the first transmission electrode and the first polar solution and the nonpolar light-absorbing solution are arranged on the first electrode protection layer. The color displaying layer further comprises a second electrode protection layer arranged on the second reflection electrode and the second transmission electrode and the second polar solution and the nonpolar color-displaying solution are arranged on the second electrode protection layer.

Each of the main pixels further comprises: two second lower baffles arranged between the second substrate and the first electrode protection layer and two second upper baffles arranged between the third substrate and the second electrode protection layer. The second upper baffles and the second lower baffles are arranged to correspond to each other so as to divide the main pixel into a red sub-pixel, a green sub-pixel, and a blue sub-pixel.

The light-blocking control layer further comprises a first light-blocking baffle. The first light-blocking baffle is

TRANSMISSION/REFLECTION DUAL-FUNCTIONAL ELECTROWETTING DISPLAY PANEL

BACKGROUND OF THE INVENTION

1. Field of the Invention

The present invention relates to the field of displaying technology, and in particular to a transmission/reflection dual-functional electrowetting display panel.

2. The Related Arts

Electrowetting (EW) is a phenomenon that change wettability of a liquid drop on a surface of an insulation substrate by changing voltage between the liquid drop and the substrate, so as to change the contact angle to result in deformation and displacement of the liquid drop. Generally, electrowetting is a technique applicable to a reflective display device, where a voltage is applied to a water-contained liquid to change the surface tension of the water-contained liquid. For example, when a voltage is applied to a defined space of a pixel that comprises a water-resistant insulator, an electrode, a water-contained liquid, and a non-water-contained liquid, the surface tension of the non-water-contained liquid changes thereby making the non-water-contained liquid move. When a positive voltage is applied to the liquid that contains a water-contained liquid and a non-water-contained coloring liquid and a negative voltage is applied to the insulator, the non-water-contained coloring liquid moves to one side to change an emitted light thereby resulting in modification or color.

A general electrowetting display panel comprises an upper electrode, a lower electrode, and a layer of a polar solution and a layer of a nonpolar solution interposed between the two electrodes. With no voltage applied, the nonpolar solution layer covers the entire pixel zone. After getting incident, an incident light will be absorbed by the nonpolar solution layer so as to result in an effect of blocking light or an effect of color displaying. Oppositely, to make the pixel zone in a bright state, electrical voltage is applied to the upper and lower electrodes to have the nonpolar solution layer shrink to an edge portion of the pixel zone and thus no longer block light thereby inducing an effect of light transmission and a fraction of the spectrum being not absorbed and change of color being not affected. Under this condition, the zone shows a light transmittable state. If a reflective layer is arranged under the polar solution layer, then the incident light will be reflected by the reflective layer to show a bright state. If a light source is arranged under the nonpolar solution layer, then light may transmit through the nonpolar solution layer to show a bright state.

As described above, the electrowetting display (EWD) technique take advantage of the property of an ink that has a surface tension different from that of water to work as a technique of the principle for driving a display medium, which, similar to a regular display device, is generally a transmissive device that cannot clearly show an image and has reduced contrast when the surrounding environment is in a high brightness condition.

SUMMARY OF THE INVENTION

An objective of the present invention is to provide a transmission/reflection dual-functional electrowetting display panel, in which each sub-pixel is controlled with four electrodes to realize conversion between a transmissive mode and a reflective mode, to improve the flexibility of use of the arranged on an upper surface of the first substrate and is located between the first reflection electrode and the first transmission electrode.

The color displaying layer further comprises a second light-blocking baffle. The second light-blocking baffle is arranged on an upper surface of the second electrode protection layer and is located exactly above a site between the second reflection electrode and the second transmission electrode.

The first reflection electrode is made of aluminum.

The first reflection electrode, the first transmission electrode, the second reflection electrode, and the second transmission electrode are driven by being applicable with an identical driving voltage or different driving voltages.

When no driving voltage is applied to drive the first reflection electrode, the first transmission electrode, the second reflection electrode, and the second transmission electrode, the nonpolar color-displaying solution is spread to entirely cover a display zone of each of the sub-pixels and the nonpolar light-absorbing solution is spread to entirely cover the display zone of each of the sub-pixels.

When a driving voltage is applied to drive the first reflection electrode or the first transmission electrode, the nonpolar light-absorbing solution is caused to shrink to the top of the first transmission electrode or the first reflection electrode; and when a driving voltage is applied to drive the second reflection electrode or the second transmission electrode, the nonpolar color-displaying solution is caused to shrink to the top of the second transmission electrode or the second reflection electrode.

The present invention also provides a transmission/reflection dual-functional electrowetting display panel, which has two operation modes of transmission and reflection, the transmission/reflection dual-functional electrowetting display panel comprising a plurality of main pixels, each of the main pixels comprising three sub-pixels, the three sub-pixels being a red sub-pixel, a green sub-pixel, and a blue sub-pixel, each of the sub-pixels comprising: a first, a second, and a third substrates that are parallel to each other, a light-blocking control layer arranged between the first and second substrates, and a color displaying layer arranged between the second and third substrates, the light-blocking control layer comprising: a first reflection electrode and a first transmission electrode that are arranged on the first substrate and a first polar solution and a nonpolar light-absorbing solution arranged on the first reflection electrode and the first transmission electrode, the color displaying layer comprising: a second reflection electrode and a second transmission electrode arranged on the second substrate and a second polar solution and a nonpolar color-displaying solution arranged on the second reflection electrode and the second transmission electrode, the first transmission electrode, the second transmission electrode, and the second reflection electrode being made of a transparent conductive material, the first reflection electrode being made of a conductive material having high reflectivity, whereby when the first reflection electrode is driven by applying a driving voltage thereto, the nonpolar light-absorbing solution shrinks to the top of the first transmission electrode and the transmission/reflection dual-functional electrowetting display panel is set in the reflective mode; and when the first transmission electrode is driven by applying a driving voltage thereto, the nonpolar light-absorbing solution shrinks to the top of the first reflection electrode and the transmission/reflection dual-functional electrowetting display panel is set in the transmissive mode;

further comprising: a plurality of first upper baffles arranged between the second and third substrates and a plurality of first lower baffles arranged between the first and second substrates, the first upper baffles and the first lower baffles being arranged to correspond to each other so as to divide the transmission/reflection dual-functional electrowetting display panel into a plurality of main pixels;

wherein the light-blocking control layer further comprises a first electrode protection layer arranged on the first reflection electrode and the first transmission electrode and the first polar solution and the nonpolar light-absorbing solution are arranged on the first electrode protection layer; and the color displaying layer further comprises a second electrode protection layer arranged on the second reflection electrode and the second transmission electrode and the second polar solution and the nonpolar color-displaying solution are arranged on the second electrode protection layer;

wherein each of the main pixels further comprises: two second lower baffles arranged between the second substrate and the first electrode protection layer and two second upper baffles arranged between the third substrate and the second electrode protection layer, the second upper baffles and the second lower baffles being arranged to correspond to each other so as to divide the main pixel into a red sub-pixel, a green sub-pixel, and a blue sub-pixel;

wherein the light-blocking control layer further comprises a first light-blocking baffle, the first light-blocking baffle being arranged on an upper surface of the first substrate and located between the first reflection electrode and the first transmission electrode; and wherein the color displaying layer further comprises a second light-blocking baffle, the second light-blocking baffle being arranged on an upper surface of the second electrode protection layer and located exactly above a site between the second reflection electrode and the second transmission electrode.

The first reflection electrode is made of aluminum.

The first reflection electrode, the first transmission electrode, the second reflection electrode, and the second transmission electrode are driven by being applicable with an identical driving voltage or different driving voltages.

When no driving voltage is applied to drive the first reflection electrode, the first transmission electrode, the second reflection electrode, and the second transmission electrode, the nonpolar color-displaying solution is spread to entirely cover a display zone of each of the sub-pixels and the nonpolar light-absorbing solution is spread to entirely cover the display zone of each of the sub-pixels.

When a driving voltage is applied to drive the first reflection electrode or the first transmission electrode, the nonpolar light-absorbing solution is caused to shrink to the top of the first transmission electrode or the first reflection electrode; and when a driving voltage is applied to drive the second reflection electrode or the second transmission electrode, the nonpolar color-displaying solution is caused to shrink to the top of the second transmission electrode or the second reflection electrode.

The efficacy of the present invention is that the present invention provides a transmission/reflection dual-functional electrowetting display panel, wherein each sub-pixel makes use of four electrodes to control the shrinking directions of a nonpolar light-absorbing solution and a nonpolar color-displaying solution so as to shrink to an area of a reflection electrode in the transmissive mode and to shrink to an area of a transmission electrode in the reflective mode to realize conversion between the transmissive mode and the reflective mode, to improve flexibility of use of the electrowetting display panel, and also to enhance the contrast ratio and the transmission ratio of the electrowetting display panel.

For better understanding of the features and technical contents of the present invention, reference will be made to the following detailed description of the present invention and the attached drawings. However, the drawings are provided for the purposes of reference and illustration and are not intended to impose undue limitations to the present invention.

BRIEF DESCRIPTION OF THE DRAWINGS

The technical solution, as well as beneficial advantages, of the present invention will be apparent from the following detailed description of an embodiment of the present invention, with reference to the attached drawings. In the drawings.

DETAILED DESCRIPTION OF THE PREFERRED EMBODIMENTS

To further expound the technical solution adopted in the present invention and the advantages thereof, a detailed description is given to a preferred embodiment of the present invention and the attached drawings.

Figure 1:
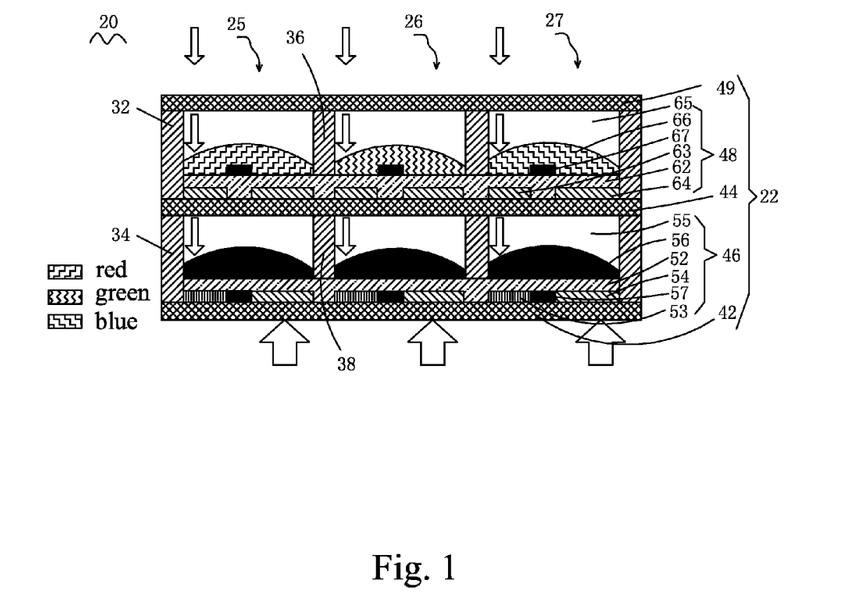
FIG. 1 is a schematic view illustrating the displaying of a black pattern by the transmission/reflection dual-functional electrowetting display panel according to the present invention.

The present invention provides a transmission/reflection dual-functional electrowetting display panel, of which operation modes include a transmissive mode and a reflective mode. As shown in FIG. 1, which is a schematic view showing the structure where no driving voltage is applied, namely a schematic view illustrating the displaying of a completely black pattern, thick arrows indicate an optic path of applied back light (BL) (transmission) and thin arrows indicate an optic path of external surrounding light (reflection). In the drawing, a description will be given to an example where each main pixel comprises three sub-pixels. The transmission/reflection dual-functional electrowetting display panel comprises a plurality of main pixels 20, a plurality of first upper baffles 32, and a plurality of first lower baffles 34. Each of the main pixels 20 comprises three sub-pixels 22, and the three sub-pixels 22 are a red sub-pixel 25, a green sub-pixel 26, and a blue sub-pixel 27. Each of the sub-pixels 22 comprises: a first, a second, and a third substrates 42, 44, 49 that are parallel to each other, a light-blocking control layer 46 arranged between the first and second substrates 42, 44, and a color displaying layer 48 arranged between the second and third substrates 44, 49. The light-blocking control layer 46 comprises: a first reflection electrode 53 and a first transmission electrode 54 that are arranged on the first substrate 42 and a first polar solution 55 and a nonpolar light-absorbing solution 56 arranged on the first reflection electrode 53 and the first transmission electrode 54. The color displaying layer 48 comprises: a second reflection electrode 63 and a second transmission electrode 64 arranged on the second substrate 44 and a second polar solution 65 and a nonpolar color-displaying solution 66 arranged on the second reflection electrode 63 and the second transmission electrode 64. When the first reflection electrode 53 is driven by applying a driving voltage thereto, the nonpolar light-absorbing solution 56 shrinks to the top of the first transmission electrode 54 and the transmission/reflection dual-functional electrowetting display panel is set in the reflective mode; and when the first transmission electrode 54 is driven by applying a driving voltage thereto, the nonpolar light-absorbing solution 56 shrinks to the top of the first reflection electrode 53 and the transmission/reflection dual-functional electrowetting display panel is set in the transmissive mode. The first and second polar solutions 55, 65 are preferably of a transparent state.

The light-blocking control layer 46 further comprises a first electrode protection layer 52 arranged on the first reflection electrode 53 and the first transmission electrode 54 and the first polar solution 55 and the nonpolar light-absorbing solution 56 are arranged on the first electrode protection layer 52. The color displaying layer 48 further comprises a second electrode protection layer 62 arranged on the second reflection electrode 63 and the second transmission electrode 64 and the second polar solution 65 and the nonpolar color-displaying solution 66 are arranged on the second electrode protection layer 62.

The plurality of first upper baffles 32 is arranged between the second and third substrates 44, 49. The plurality of first lower baffles 34 is arranged between the first and second substrates 42, 44. The first upper baffles 32 and the first lower baffles 34 are arranged to correspond to each other so as to divide the transmission/reflection dual-functional electrowetting display panel into a plurality of main pixels 20. Each of the main pixels 20 further comprises: two second lower baffles 38 arranged between the second substrate 44 and the first electrode protection layer 52 and two second upper baffles 36 arranged between the third substrate 49 and the second electrode protection layer 62. The second upper baffles 36 and the second lower baffles 38 are arranged to correspond to each other so as to divide each main pixel 20 into a red sub-pixel 25, a green sub-pixel 26, and a blue sub-pixel 27, which can be individually controlled to display red light, green light, or blue light.

The light-blocking control layer 46 further comprises a first light-blocking baffle 57. The first light-blocking baffle 57 is arranged on an upper surface of the first substrate 42 and is located between the first reflection electrode 53 and the first transmission electrode 54. The first light-blocking baffle 57 isolates the first reflection electrode 53 and the first transmission electrode 54 from each other to prevent shorting between the two. Further, the first light-blocking baffle 57 blocks light so as to prevent light from passing through a gap between the first reflection electrode 53 and the first transmission electrode 54 to result in light leaking. The color displaying layer 48 further comprises a second light-blocking baffle 67. The second light-blocking baffle 67 is arranged on an upper surface of the second electrode protection layer 62 and is located exactly above a site between the second reflection electrode 63 and the second transmission electrode 64. The second light-blocking baffle 67 blocks light and prevents light of the light-blocking control layer 46 or the color displaying layer 48 from leaking through a gap between the second reflection electrode 63 and the second transmission electrode 64 to reach the color displaying layer 48 or the light-blocking control layer 46 to affect the quality of displaying.

The first reflection electrode 53, the first transmission electrode 54, the second reflection electrode 63, and the second transmission electrode 64 can be driven by applying the same driving voltage or different driving voltages. Thus, when different driving voltages are used to respectively drive the first reflection electrode 53, the first transmission electrode 54, the second reflection electrode 63, or the second transmission electrode 64, each main pixel 20 or sub-pixel 22 can be built up individually to achieve an arrangement for brightness or other arrangement that suits the need of a user. At the time when no driving voltage is applied to drive the first reflection electrode 53, the first transmission electrode 54, the second reflection electrode 63, and the second transmission electrode 64, the nonpolar color-displaying solution 66 is spread to entirely cover a display zone of each sub-pixel 22 and the nonpolar light-absorbing solution 56 is spread to entirely cover the display zone of each sub-pixels 22, whereby light, after getting incident, will be subject to optical absorption to achieve an effect of light blocking or an effect of color displaying. When a driving voltage is applied to drive the first reflection electrode 53 or the first transmission electrode 54, the nonpolar light-absorbing solution 56 is caused to shrink to the top of the first transmission electrode 54 or the first reflection electrode 53; and when a driving voltage is applied to drive the second reflection electrode 63 or the second transmission electrode 64, the nonpolar color-displaying solution 66 is caused to shrink to the top of the second transmission electrode 64 or the second reflection electrode 63, so that light is not absorbed and thus not block and an effect of transmission is achieved and a segment of the light spectrum is not absorbed to not affect the change of color.

The first transmission electrode 54, the second transmission electrode 64, and the second reflection electrode 64 are all made of a transparent conductive material to allow light to transmit therethrough to achieve an effect of displaying. The first reflection electrode 53 is made of a conductive material having high reflectivity to maximally reflect the surrounding light so as to take advantage of the surrounding light to realize the reflective mode of the display panel. Preferably, the first reflection electrode 53 is made of aluminum.

Figure 2:
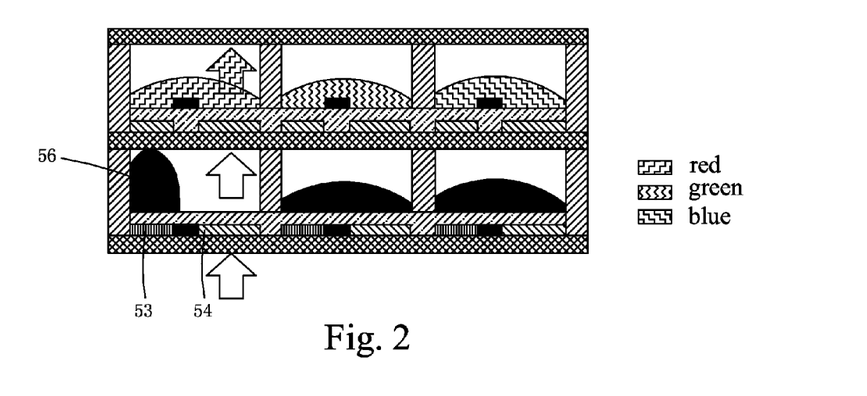
FIG. 2 is a schematic view illustrating the displaying of red light by the transmission/reflection dual-functional electrowetting display panel according to the present invention in a transmissive mode.

The principle of operation of the transmission/reflection dual-functional electrowetting display panel will be described as follows:

Referring to FIGS. 1 and 2, to use the back light (not shown) to display red light, namely R pattern, by means of the transmissive mode of the electrowetting display panel, electricity is conducted through the first transmission electrode 54 of the light-blocking control layer 46 of the red sub-pixel 25 to apply a driving voltage thereto so as to cause the nonpolar light-absorbing solution 56 of the red sub-pixel 25 to shrink to the area of the reflection electrode, namely the top of the first reflection electrode 53, while no driving voltage is applied to the first transmission electrodes 54 of the light-blocking control layers of the blue sub-pixel 27 and the green sub-pixel 26, whereby light is allowed to transmit through the display zone of the light-blocking control layer 46 of the red sub-pixel 25 and pass through the nonpolar color-displaying solution 66 of the color displaying layer 48 of the red sub-pixel 25 to generate a red light.

Figure 3:
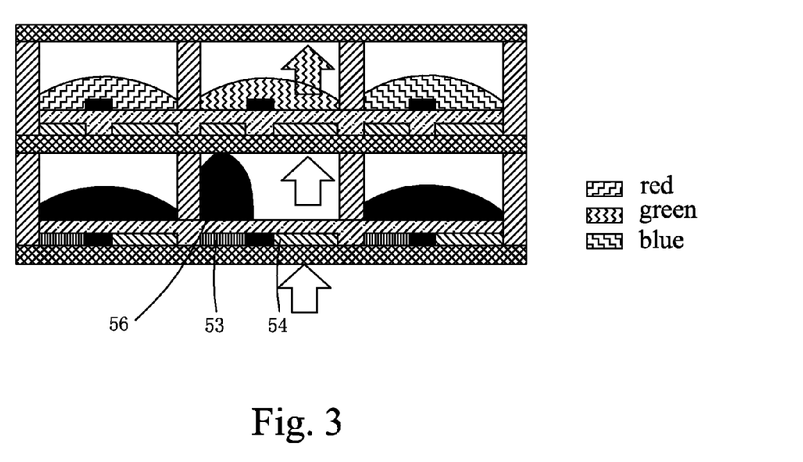
FIG. 3 is a schematic view illustrating the displaying of green light by the transmission/reflection dual-functional electrowetting display panel according to the present invention in a transmissive mode.

Referring to FIGS. 1 and 3, to use the back light (not shown) to display green light, namely G pattern, by means of the transmissive mode of the electrowetting display panel, electricity is conducted through the first transmission electrode 54 of the light-blocking control layer 46 of the green sub-pixel 26 to apply a driving voltage thereto so as to cause the nonpolar light-absorbing solution 56 of the green sub-pixel 26 to shrink to the area of the reflection electrode, namely the top of the first reflection electrode 53, while no driving voltage is applied to the first transmission electrodes 54 of the light-blocking control layers 46 of the red sub-pixel 25 and the blue sub-pixel 27, whereby light is allowed to transmit through the display zone of the light-blocking control layer 46 of the green sub-pixel 26 and pass through the nonpolar color-displaying solution 66 of the color displaying layer 48 of the green sub-pixel 26 to generate a green light.

Figure 4:
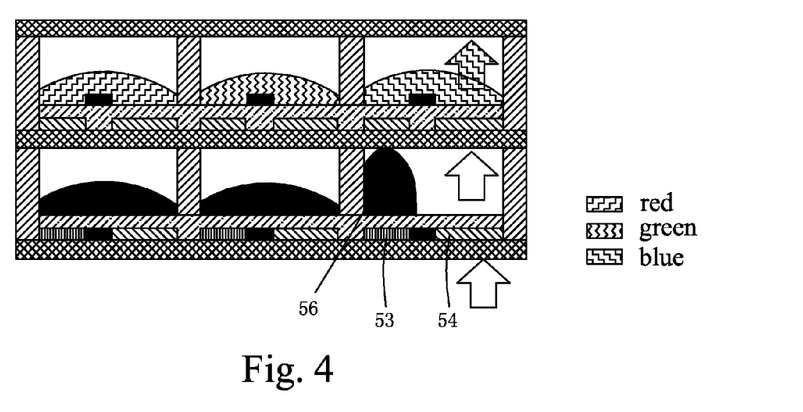
FIG. 4 is a schematic view illustrating the displaying of blue light by the transmission/reflection dual-functional electrowetting display panel according to the present invention in a transmissive mode.

Referring to FIGS. 1 and 4, to use the back light (not shown) to display blue light, namely B pattern, by means of the transmissive mode of the electrowetting display panel, electricity is conducted through the first transmission electrode 54 of the light-blocking control layer 46 of the blue sub-pixel 27 to apply a driving voltage thereto so as to cause the nonpolar light-absorbing solution 56 of the blue sub-pixel 27 to shrink to the area of the reflection electrode, namely the top of the first reflection electrode 53, while no driving voltage is applied to the first transmission electrodes 54 of the light-blocking control layers 46 of the red sub-pixel 25 and the green sub-pixel 26, whereby light is allowed to transmit through the display zone of the light-blocking control layer 46 of the blue sub-pixel 27 and pass through the nonpolar color-displaying solution 66 of the color displaying layer 48 of the blue sub-pixel 27 to generate a blue light.

Figure 5:
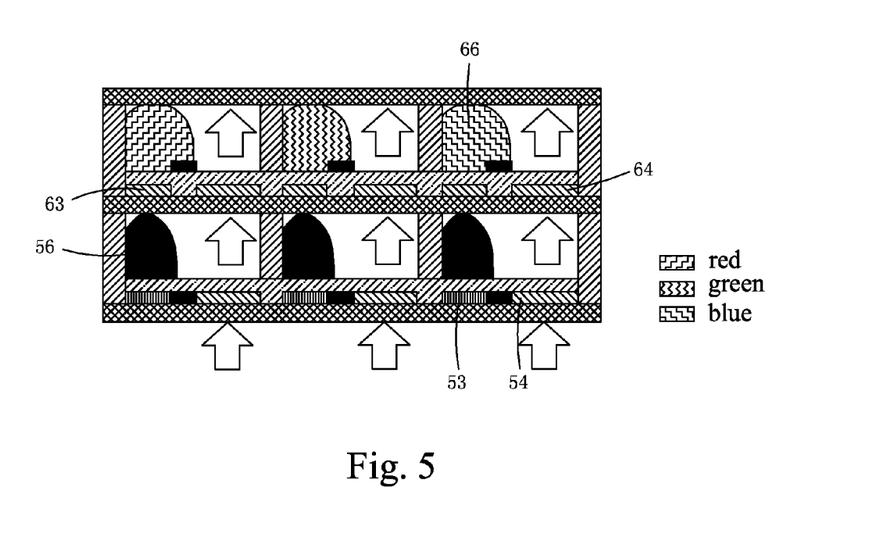
FIG. 5 is a schematic view illustrating the state of a white pattern of the transmission/reflection dual-functional electrowetting display panel according to the present invention in a transmissive mode.

Referring to FIGS. 1 and 5, a state of a white pattern of the transmissive mode of the electrowetting display panel according to the present invention is illustrated, wherein electricity is conducted through the first and second transmission electrodes 54, 64 of the red sub-pixel 25, the blue sub-pixel 27, and the green sub-pixel 26 to apply driving voltages thereto to cause the nonpolar light-absorbing solutions 56 to shrink to the areas of the reflection electrodes (the tops of the first reflection electrodes 53) and also cause the nonpolar color-displaying solutions 66 to shrink to the areas of the reflection electrodes (the tops of the second reflection electrodes 63), whereby light, after emitting from the back light source, is not blocked by the nonpolar light-absorbing solutions 56 of the light-blocking control layers 46 and is not subjected to absorption of a segment of spectrum thereof by the nonpolar color-displaying solutions 66 of the color displaying layers 48 so as to greatly improve transmission ration.

Figure 6:
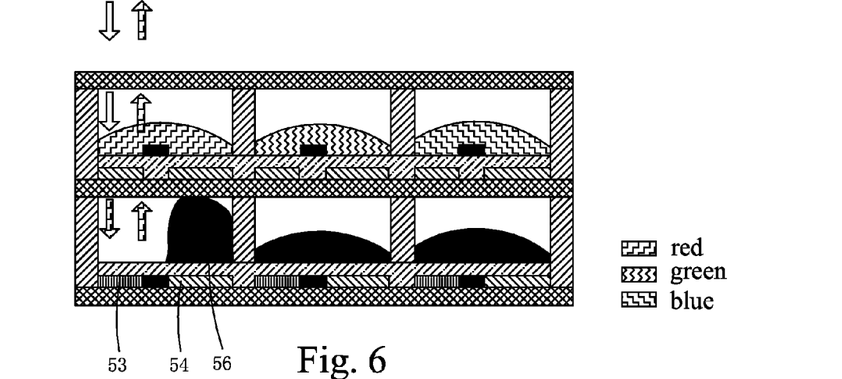
FIG. 6 is a schematic view illustrating the displaying of red light by the transmission/reflection dual-functional electrowetting display panel according to the present invention in a reflective mode.

Referring to FIGS. 1 and 6, to display red light, namely R pattern, by means of the reflective mode of the electrowetting display panel with surrounding light, electricity is conducted through the first reflection electrode 53 of the light-blocking control layer 46 of the red sub-pixel 25 to apply a driving voltage thereto so as to cause the nonpolar light-absorbing solution 56 of the red sub-pixel 25 to shrink to the area of the transmission electrode, namely the top of the first transmission electrode 54, whereby the surrounding light is allowed to transmit through the light-blocking control layer 46 of the red sub-pixel 25 and is reflected by the first reflection electrode 53 to pass through the color displaying layer 48 of the red sub-pixel 25 to emit outward; while no driving voltage is applied to the first reflection electrodes 53 of the light-blocking control layers 46 of the blue sub-pixel 27 and the green sub-pixel 26, so that only the red light is displayed.

Figure 7:
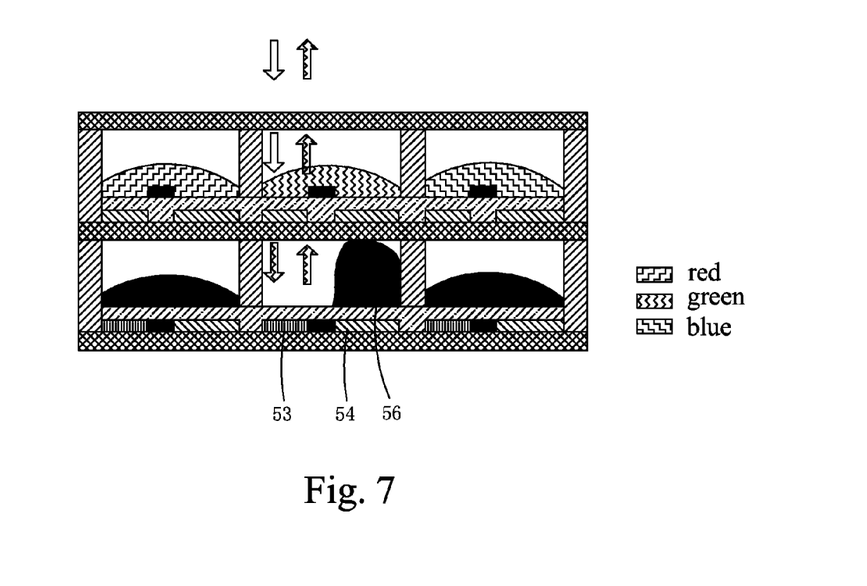
FIG. 7 is a schematic view illustrating the displaying of green light by the transmission/reflection dual-functional electrowetting display panel according to the present invention in a reflective mode.

Referring to FIGS. 1 and 7, to display green light, namely G pattern, by means of the reflective mode of the electrowetting display panel with surrounding light, electricity is conducted through the first reflection electrode 53 of the light-blocking control layer 46 of the green sub-pixel 26 to apply a driving voltage thereto so as to cause the nonpolar light-absorbing solution 56 of the green sub-pixel 26 to shrink to the area of the transmission electrode, namely the top of the first transmission electrode 54, whereby the surrounding light is allowed to transmit through the light-blocking control layer 46 of the green sub-pixel 26 and is reflected by the first reflection electrode 53 to pass through the color displaying layer 48 of the green sub-pixel 26 to emit outward; while no driving voltage is applied to the first reflection electrodes 53 of the light-blocking control layers 46 of the blue sub-pixel 27 and the red sub-pixel 25, so that only the green light is displayed.

Figure 8:
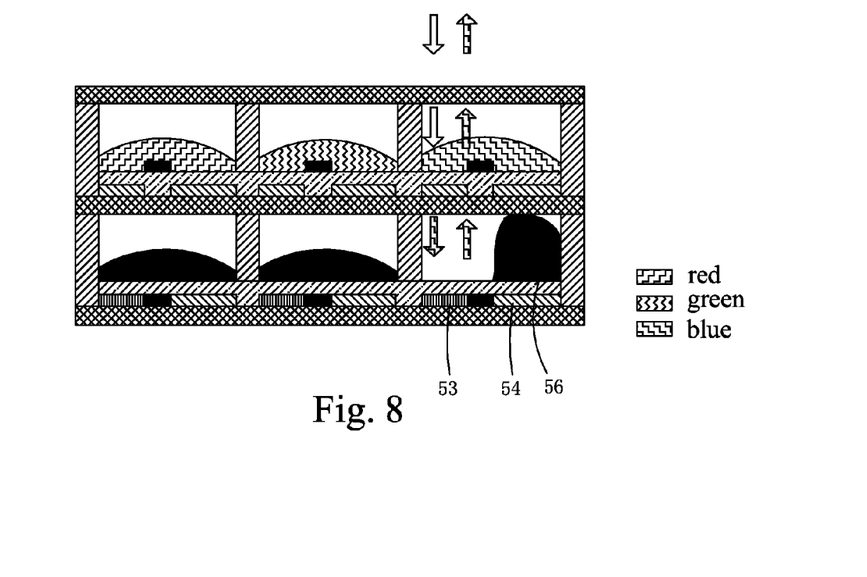
FIG. 8 is a schematic view illustrating the displaying of blue light by the transmission/reflection dual-functional electrowetting display panel according to the present invention in a reflective mode.

Referring to FIGS. 1 and 8, to display blue light, namely B pattern, by means of the reflective mode of the electrowetting display panel with surrounding light, electricity is conducted through the first reflection electrode 53 of the light-blocking control layer 46 of the blue sub-pixel 27 to apply a driving voltage thereto so as to cause the nonpolar light-absorbing solution 56 of the blue sub-pixel 27 to shrink to the area of the transmission electrode, namely the top of the first transmission electrode 54, whereby the surrounding light is allowed to transmit through the light-blocking control layer 46 of the blue sub-pixel 27 and is reflected by the first reflection electrode 53 to pass through the color displaying layer 48 of the blue sub-pixel 27 to emit outward; while no driving voltage is applied to the first reflection electrodes 53 of the light-blocking control layers 46 of the green sub-pixel 26 and the red sub-pixel 25, so that only the blue light is displayed.

Figure 9:
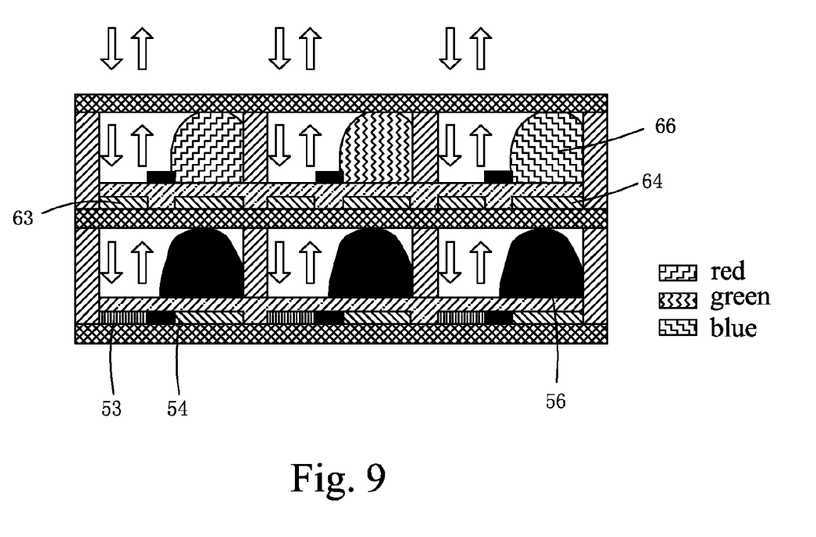
FIG. 9 is a schematic view illustrating the state of a white pattern of the transmission/reflection dual-functional electrowetting display panel according to the present invention in a reflective mode.

Referring to FIGS. 1 and 9, a state of a white pattern of the reflective mode of the electrowetting display panel according to the present invention is illustrated, wherein electricity is conducted through the first and second reflection electrodes 53, 63 of the red sub-pixel 25, the blue sub-pixel 27, and the green sub-pixel 26 to apply driving voltages thereto to cause the nonpolar light-absorbing solutions 56 to shrink to the areas of the transmission electrodes (the tops of the first transmission electrodes 54) and also cause the nonpolar color-displaying solutions 66 to shrink to the areas of the transmission electrodes (the tops of the second transmission electrodes 64), whereby light is not blocked by the nonpolar light-absorbing solutions 56 of the light-blocking control layers 46 and is not subjected to absorption of a segment of spectrum thereof by the nonpolar color-displaying solutions 66 of the color displaying layers 48 so as to greatly improve transmission ration. Contrast is defined as L255/L0, so that the contrast is superior to the conventional electrowetting display panels.

In summary, the present invention provides a transmission/reflection dual-functional electrowetting display panel, wherein each sub-pixel makes use of four electrodes to control the shrinking directions of a nonpolar light-absorbing solution and a nonpolar color-displaying solution so as to shrink to an area of a reflection electrode in the transmissive mode and to shrink to an area of a transmission electrode in the reflective mode to realize conversion between the transmissive mode and the reflective mode, to improve flexibility of use of the electrowetting display panel, and also to enhance the contrast ratio and the transmission ratio of the electrowetting display panel.

Based on the description given above, those having ordinary skills of the art may easily contemplate various changes and modifications of the technical solution and technical ideas of the present invention and all these changes and modifications are considered within the protection scope of right for the present invention.

What is claimed is:

1. A transmission/reflection dual-functional electrowetting display panel, which has two operation modes of transmission and reflection, the transmission/reflection dual-functional electrowetting display panel comprising a plurality of main pixels, each of the main pixels comprising three sub-pixels, the three sub-pixels being a red sub-pixel, a green sub-pixel, and a blue sub-pixel, each of the sub-pixels comprising: a first, a second, and a third substrates that are parallel to each other, a light-blocking control layer arranged between the first and second substrates, and a color displaying layer arranged between the second and third substrates, the light-blocking control layer comprising: a first reflection electrode and a first transmission electrode that are arranged on the first substrate and a first polar solution and a nonpolar light-absorbing solution arranged on the first reflection electrode and the first transmission electrode, the color displaying layer comprising: a second reflection electrode and a second transmission electrode arranged on the second substrate and a second polar solution and a nonpolar color-displaying solution arranged on the second reflection electrode and the second transmission electrode, the first transmission electrode, the second transmission electrode, and the second reflection electrode being made of a transparent conductive material, the first reflection electrode being made of a conductive material having high reflectivity, whereby when the first reflection electrode is driven by applying a driving voltage thereto, the nonpolar light-absorbing solution shrinks to the top of the first transmission electrode and the transmission/reflection dual-functional electrowetting display panel is set in the reflective mode; and when the first transmission electrode is driven by applying a driving voltage thereto, the nonpolar light-absorbing solution shrinks to the top of the first reflection electrode and the transmission/reflection dual-functional electrowetting display panel is set in the transmissive mode.

2. The transmission/reflection dual-functional electrowetting display panel as claimed in claim 1 further comprising: a plurality of first upper baffles arranged between the second and third substrates and a plurality of first lower baffles arranged between the first and second substrates, the first upper baffles and the first lower baffles being arranged to correspond to each other so as to divide the transmission/reflection dual-functional electrowetting display panel into a plurality of main pixels.

3. The transmission/reflection dual-functional electrowetting display panel as claimed in claim 1, wherein the light-blocking control layer further comprises a first electrode protection layer arranged on the first reflection electrode and the first transmission electrode and the first polar solution and the nonpolar light-absorbing solution are arranged on the first electrode protection layer; and the color displaying layer further comprises a second electrode protection layer arranged on the second reflection electrode and the second transmission electrode and the second polar solution and the nonpolar color-displaying solution are arranged on the second electrode protection layer.

4. The transmission/reflection dual-functional electrowetting display panel as claimed in claim 3, wherein each of the main pixels further comprises: two second lower baffles arranged between the second substrate and the first electrode protection layer and two second upper baffles arranged between the third substrate and the second electrode protection layer, the second upper baffles and the second lower baffles being arranged to correspond to each other so as to divide the main pixel into a red sub-pixel, a green sub-pixel, and a blue sub-pixel.

5. The transmission/reflection dual-functional electrowetting display panel as claimed in claim 1, wherein the light-blocking control layer further comprises a first light-blocking baffle, the first light-blocking baffle being arranged on an upper surface of the first substrate and located between the first reflection electrode and the first transmission electrode.

6. The transmission/reflection dual-functional electrowetting display panel as claimed in claim 3, wherein the color displaying layer further comprises a second light-blocking baffle, the second light-blocking baffle being arranged on an upper surface of the second electrode protection layer and located exactly above a site between the second reflection electrode and the second transmission electrode.

7. The transmission/reflection dual-functional electrowetting display panel as claimed in claim 1, wherein the first reflection electrode is made of aluminum.

8. The transmission/reflection dual-functional electrowetting display panel as claimed in claim 1, wherein the first reflection electrode, the first transmission electrode, the second reflection electrode, and the second transmission electrode are driven by being applicable with an identical driving voltage or different driving voltages.

9. The transmission/reflection dual-functional electrowetting display panel as claimed in claim 1, wherein when no driving voltage is applied to drive the first reflection electrode, the first transmission electrode, the second reflection electrode, and the second transmission electrode, the nonpolar color-displaying solution is spread to entirely cover a display zone of each of the sub-pixels and the nonpolar light-absorbing solution is spread to entirely cover the display zone of each of the sub-pixels.

10. The transmission/reflection dual-functional electrowetting display panel as claimed in claim 9, wherein when a driving voltage is applied to drive the first reflection electrode or the first transmission electrode, the nonpolar light-absorbing solution is caused to shrink to the top of the first transmission electrode or the first reflection electrode; and when a driving voltage is applied to drive the second reflection electrode or the second transmission electrode, the nonpolar color-displaying solution is caused to shrink to the top of the second transmission electrode or the second reflection electrode.

11. A transmission/reflection dual-functional electrowetting display panel, which has two operation modes of transmission and reflection, the transmission/reflection dual-functional electrowetting display panel comprising a plurality of main pixels, each of the main pixels comprising three sub-pixels, the three sub-pixels being a red sub-pixel, a green sub-pixel, and a blue sub-pixel, each of the sub-pixels comprising: a first, a second, and a third substrates that are parallel to each other, a light-blocking control layer arranged between the first and second substrates, and a color displaying layer arranged between the second and third substrates, the light-blocking control layer comprising: a first reflection electrode and a first transmission electrode that are arranged on the first substrate and a first polar solution and a nonpolar light-absorbing solution arranged on the first reflection electrode and the first transmission electrode, the color displaying layer comprising: a second reflection electrode and a second transmission electrode arranged on the second substrate and a second polar solution and a nonpolar color-displaying solution arranged on the second reflection electrode and the second transmission electrode, the first transmission electrode, the second transmission electrode, and the second reflection electrode being made of a transparent conductive material, the first reflection electrode being made of a conductive material having high reflectivity, whereby when the first reflection electrode is driven by applying a driving voltage thereto, the nonpolar light-absorbing solution shrinks to the top of the first transmission electrode and the transmission/reflection dual-functional electrowetting display panel is set in the reflective mode; and when the first transmission electrode is driven by applying a driving voltage thereto, the nonpolar light-absorbing solution shrinks to the top of the first reflection electrode and the transmission/reflection dual-functional electrowetting display panel is set in the transmissive mode;

further comprising: a plurality of first upper baffles arranged between the second and third substrates and a plurality of first lower baffles arranged between the first and second substrates, the first upper baffles and the first lower baffles being arranged to correspond to each other so as to divide the transmission/reflection dual-functional electrowetting display panel into a plurality of main pixels;

wherein the light-blocking control layer further comprises a first electrode protection layer arranged on the first reflection electrode and the first transmission electrode and the first polar solution and the nonpolar light-absorbing solution are arranged on the first electrode protection layer; and the color displaying layer further comprises a second electrode protection layer arranged on the second reflection electrode and the second transmission electrode and the second polar solution and the nonpolar color-displaying solution are arranged on the second electrode protection layer;

wherein each of the main pixels further comprises: two second lower baffles arranged between the second substrate and the first electrode protection layer and two second upper baffles arranged between the third substrate and the second electrode protection layer, the second upper baffles and the second lower baffles being arranged to correspond to each other so as to divide the main pixel into a red sub-pixel, a green sub-pixel, and a blue sub-pixel;

wherein the light-blocking control layer further comprises a first light-blocking baffle, the first light-blocking baffle being arranged on an upper surface of the first substrate and located between the first reflection electrode and the first transmission electrode; and wherein the color displaying layer further comprises a second light-blocking baffle, the second light-blocking baffle being arranged on an upper surface of the second electrode protection layer and located exactly above a site between the second reflection electrode and the second transmission electrode.

12. The transmission/reflection dual-functional electrowetting display panel as claimed in claim 11, wherein the first reflection electrode is made of aluminum.

13. The transmission/reflection dual-functional electrowetting display panel as claimed in claim 11, wherein the first reflection electrode, the first transmission electrode, the second reflection electrode, and the second transmission electrode are driven by being applicable with an identical driving voltage or different driving voltages.

14. The transmission/reflection dual-functional electrowetting display panel as claimed in claim 11, wherein when no driving voltage is applied to drive the first reflection electrode, the first transmission electrode, the second reflection electrode, and the second transmission electrode, the nonpolar color-displaying solution is spread to entirely cover a display zone of each of the sub-pixels and the nonpolar light-absorbing solution is spread to entirely cover the display zone of each of the sub-pixels.

15. The transmission/reflection dual-functional electrowetting display panel as claimed in claim 11, wherein when a driving voltage is applied to drive the first reflection electrode or the first transmission electrode, the nonpolar light-absorbing solution is caused to shrink to the top of the first transmission electrode or the first reflection electrode; and when a driving voltage is applied to drive the second reflection electrode or the second transmission electrode, the nonpolar color-displaying solution is caused to shrink to the top of the second transmission electrode or the second reflection electrode.

* * * * *